(12) United States Patent
Davidson

(10) Patent No.: US 6,485,064 B1
(45) Date of Patent: Nov. 26, 2002

(54) HOSE CONNECTOR AND THREADED COLLAR THEREFOR

(75) Inventor: Paul Davidson, Macclesfield (GB)

(73) Assignee: Oystertec Plc (GB)

( * ) Notice: Subject to any disclaimer, the term of this patent is extended or adjusted under 35 U.S.C. 154(b) by 0 days.

(21) Appl. No.: 09/601,711

(22) PCT Filed: Feb. 9, 1999

(86) PCT No.: PCT/GB99/00230

§ 371 (c)(1),
(2), (4) Date: Oct. 27, 2000

(87) PCT Pub. No.: WO99/40354

PCT Pub. Date: Aug. 12, 1999

(30) Foreign Application Priority Data

Feb. 9, 1998 (GB) .............................................. 9802634
Mar. 2, 1998 (GB) .............................................. 9804234

(51) Int. Cl.⁷ ................................................ F16L 25/00
(52) U.S. Cl. ..................... 285/353; 285/276; 285/281; 285/256
(58) Field of Search ................... 285/354, 353, 285/256, 276, 280, 281

(56) References Cited

U.S. PATENT DOCUMENTS

| 2,319,024 A | * | 5/1943 | Wehringer | 285/256 |
|---|---|---|---|---|
| 2,570,406 A | * | 10/1951 | Troshkin | 285/281 |
| 2,574,625 A | * | 11/1951 | Coss | 285/281 |
| 3,367,681 A | * | 2/1968 | Braukman | 285/276 |
| 3,695,642 A | * | 10/1972 | DeWoody | 285/353 |
| 3,921,297 A | * | 11/1975 | Vit | 285/281 |
| 3,999,781 A | * | 12/1976 | Todd | 285/256 |
| 4,018,460 A | * | 4/1977 | Morris et al. | 285/256 |
| 4,068,867 A | * | 1/1978 | Rodgers | 285/281 |
| 4,269,237 A | | 5/1981 | Berger | 141/346 |
| 4,589,688 A | * | 5/1986 | Johnson | 285/256 |
| 4,648,634 A | | 3/1987 | Kelch | 285/356 |
| 4,671,542 A | * | 6/1987 | Juchnowski | 285/256 |
| 4,991,876 A | * | 2/1991 | Mulvey | 285/256 |
| 5,024,419 A | * | 6/1991 | Mulvey | 285/256 |
| 5,141,262 A | * | 8/1992 | Bartholomew | 285/356 |
| 5,435,413 A | | 7/1995 | Schoenborn | 184/1.5 |
| 5,516,155 A | * | 5/1996 | Ko | 285/256 |
| 6,217,082 B1 | * | 4/2001 | Orcutt | 285/272 |
| 6,227,579 B1 | * | 5/2001 | Humphreys | 285/281 |
| 2001/0015232 A1 | * | 8/2001 | Seghi | 285/256 |

FOREIGN PATENT DOCUMENTS

DE 4430114 A1 2/1996 .......... F16L/33/207

* cited by examiner

*Primary Examiner*—Eric K. Nicholson
(74) *Attorney, Agent, or Firm*—Myers Bigel Sibley & Sajovec

(57) ABSTRACT

A connector is forming a connection between a pipe or other item having a threaded end and a length of hose. The connector comprises an elongate hose engaging element (5) and, located thereon, a collar (35) having a threaded portion (39) for engagement with a threaded pipe end. The connector is provided with sealing means (49) for sealing between the collar and the hose engaging element.

9 Claims, 4 Drawing Sheets

HOSE CONNECTOR AND THREADED COLLAR THEREFOR

This invention relates to hose connectors and in particular connectors for forming a connection between an item having an internally or externally threaded end and a length of flexible hose. The item may be, for instance, a pipe, a pipe fitting, a water tap, a valve, a tank outlet or other device or apparatus to which it is desired to connect a flexible hose.

Reference will be made hereinafter to a pipe but it should be understood that the only requirement is that the member to which the hose is to be connected should have a threaded end, whether male or female threaded.

Traditionally, a hosepipe connection to a pipe carrying, for instance, a female threaded end consists of a bayonet-type hose engaging element carrying a captive nut for engagement with one threaded portion of an intermediate member or nipple. This intermediate member or nipple carries a second threaded portion for engagement with the threaded pipe end. Between the two threaded portions there is located a region with a hexagonal section which may be engaged by hand or a suitable tool while the threaded connections are being made.

The above mentioned intermediate element or nipple is an expensive item in a hose connector. Furthermore, in the case where the pipe end and the hose pipe are of different sizes then two separate connectors are required to achieve both connection and size conversion.

According to the present invention there is provided a connector for forming a connection between a pipe or other item having a threaded end and a length of hose, the connector comprising an elongate hose engaging element and, located thereon, a collar having a threaded portion for engagement with the threaded pipe end, the connector being provided with sealing means for sealing between the collar and the hose engaging element.

Preferably, the connector is provided with further sealing means for sealing between the collar and the pipe.

Preferably the hose engaging element has a first region adapted to engage the hose and a second region, longitudinally separate from the first region, for accommodating the collar. More preferably, the second region of the hose engaging element is provided with means for preventing separation of the collar from that end of the hose engaging element remote from the first region.

Preferably, the first and second sealing means are provided by O-rings. The collar is shaped to accommodate one O-ring in an internal recess so that it bears upon the hose engaging element. The other O-ring is located about the outer surface of the collar so that it bears against the pipe end.

Accordingly a connector in accordance with the present invention is a simple device and does not require the relatively expensive intermediate element or nipple forming part of the known connectors of this type. The collar of the connector of the invention can be of different thicknesses so that pipe ends of different diameter can be accommodated. In this way the connector can be a size converter as well as providing the connection to the hose pipe.

The present invention also provides a collar for use with a connector of the present invention, the collar having a threaded portion for engagement with a threaded pipe end and being provided with first sealing means for sealing means between the collar and the pipe end and second sealing means for sealing between the collar and a hose engaging element about which it is adapted to locate.

The invention will now be further explained, by way of example only, and with reference to the accompanying drawings, in which.

Figure 1:
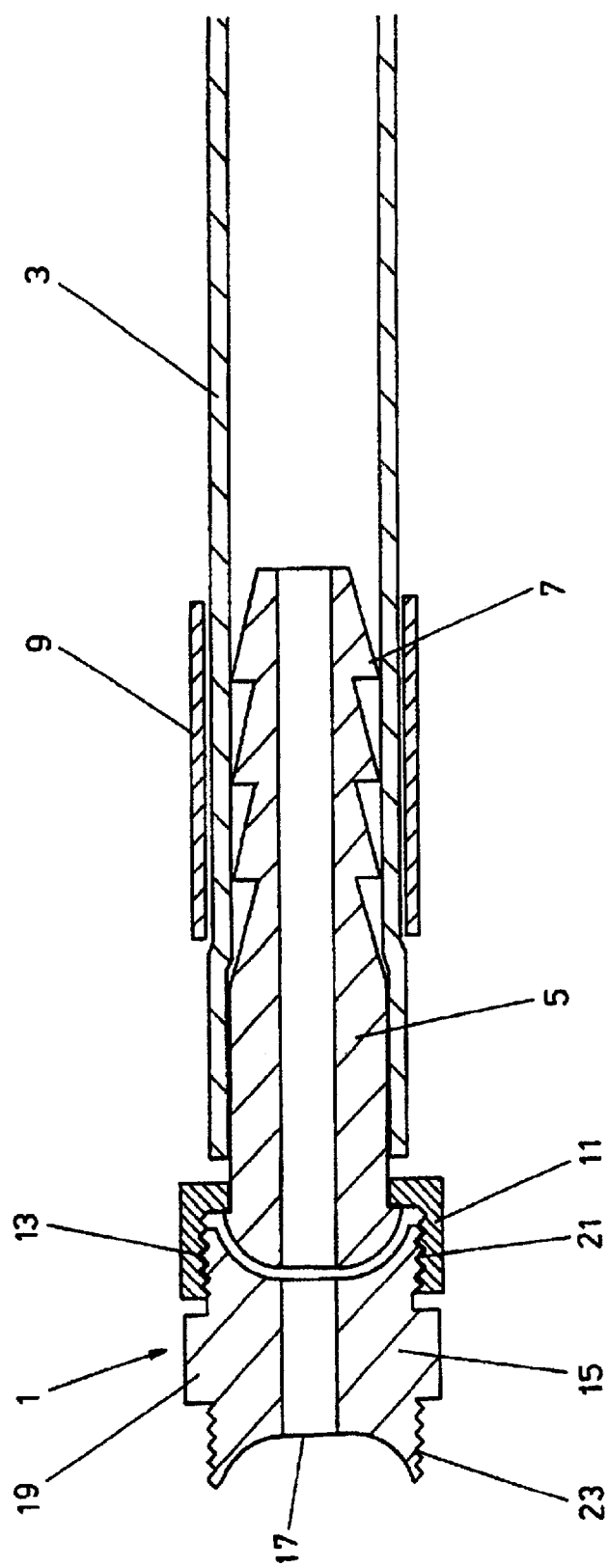
FIG. 1 is a longitudinal section through a known connector shown in engagement with a length of hose.

Referring to FIG. 1 of the accompanying drawings, a known connector 1 is shown in engagement with a length of hose 3. The connector 1 includes an elongate hose engaging element 5 which is in the form of a short tube having a plurality of serrations 7 adjacent one end which is the end inserted into the hose 3. When inserted into the hose a compression collar or jubilee clip 9 is tightened on the hose in the region of the serrations 7 so that the latter bite into the internal surface of the hose and prevent removal of element 5 from the hose.

At its other end, exterior to hose 3, element 5 is provided with a captive nut 11 having an internally threaded portion 13. As seen in FIG. 1, the end of a element 5, remote from hose 3, is enlarged, thereby preventing removal from that end of nut 11, and it is rounded to provide a concave surface to match a corresponding convex surface on an intermediate element or nipple 15.

Nipple 15 is provided with a central longitudinal bore 17 and may be regarded as a short tubular element having convex ends, one of which accommodates the concave end of element 5, as indicated above.

Located centrally between the concave ends of element 15 is a gripping section 19 having an external hexagonal profile enabling easy gripping by hand or by an appropriate tool. Between section 19 and each end of element 15 is a threaded section 21, 23 of which threaded section 21 is, as shown in FIG. 1 for engagement with the captive nut 11. The other threaded section 23 is for engagement with a female threaded section provided on a water tap, pipe end or other fitting (not shown).

Nipple 15 is a relatively expensive item in the above described connector. Furthermore, a separate size converter is required where the connection is between a pipe end and a hose of significantly different diameters.

Figure 2:
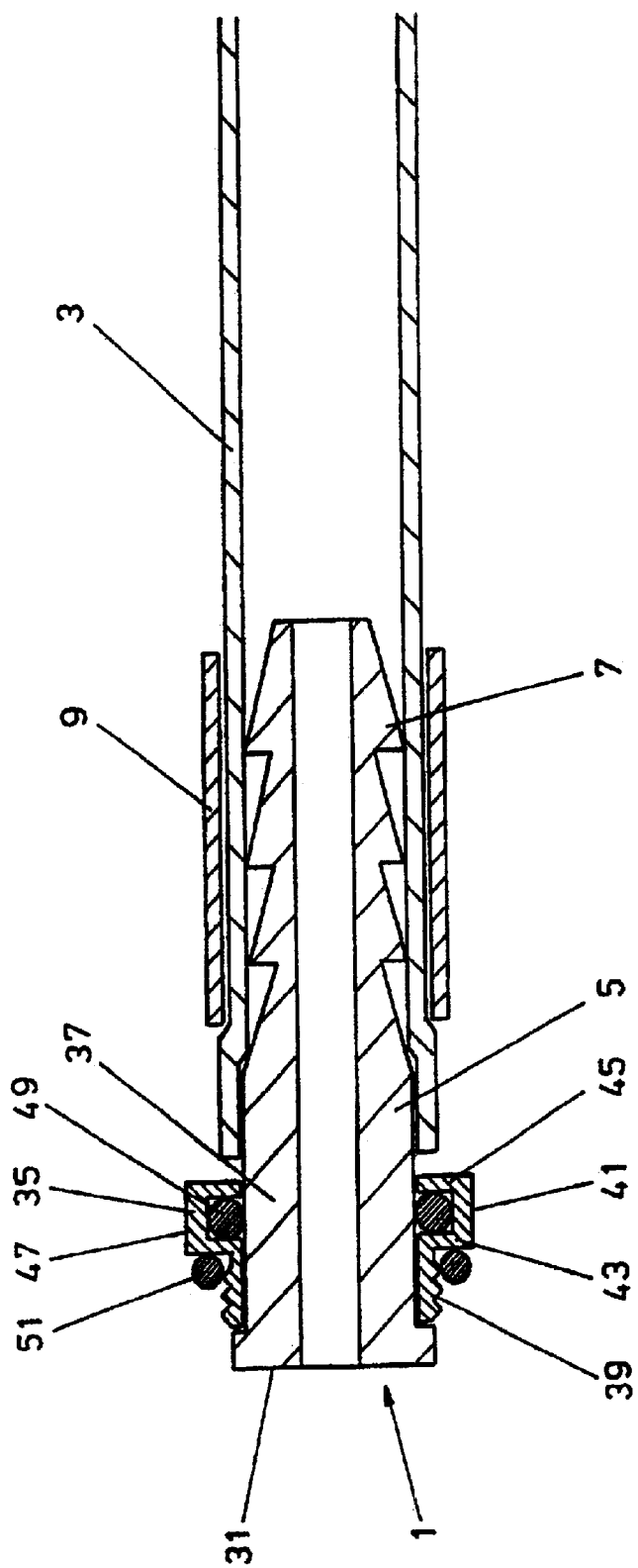
FIG. 2 is a longitudinal section showing a first embodiment of a connector of the invention in engagement with a length of hose.

Referring to FIG. 2 of the accompanying drawings, a connector in accordance with the present invention has features in common with the known connector as shown in FIG. 1. Such features are given the same reference numerals as the corresponding features of the FIG. 1 connector and will not be further described.

The hose engaging element 5 has a flat end face 31 at the end remote from hose 3. Provided at this end is an integral outwardly extending flange 33 which serves to prevent removal of a collar 35 from that end of the element 5.

Collar 35 surrounds a circular cylindrical section 37 of element 5 which is located between flange 33 and the end of the hose 3.

Collar 35 includes an externally threaded section 39 extending from one longitudinal end of collar 35 to a position about half-way along the collar. Extending longitudinally from threaded section 39 is an O-ring accommodating section 41. Section 41 includes two radially extending portions 43 and 45 separated by a circular cylindrical portion 47 of greater diameter than threaded section 39. Thus, section 41 defines an internal recess within which is located an O-ring 49 whose free surface bears against the outer surface of section 37 of element 5.

Between O-ring accommodating section 41 and threaded section 39 there is located a second O-ring 51 which provides a free surface for engagement against a pipe end (not shown) when the collar 35 is brought into threaded engagement with this pipe end.

It will be seen that, in the connector shown in FIG. 2, a simple collar held on the end of the hose engaging element 5 replaces the nipple and captive nut elements of the known connector shown in FIG. 1. Furthermore, by using a collar of the appropriate thickness, size conversion can be accommodated between a pipe connector of one size and a hose of a different size.

Figure 3:
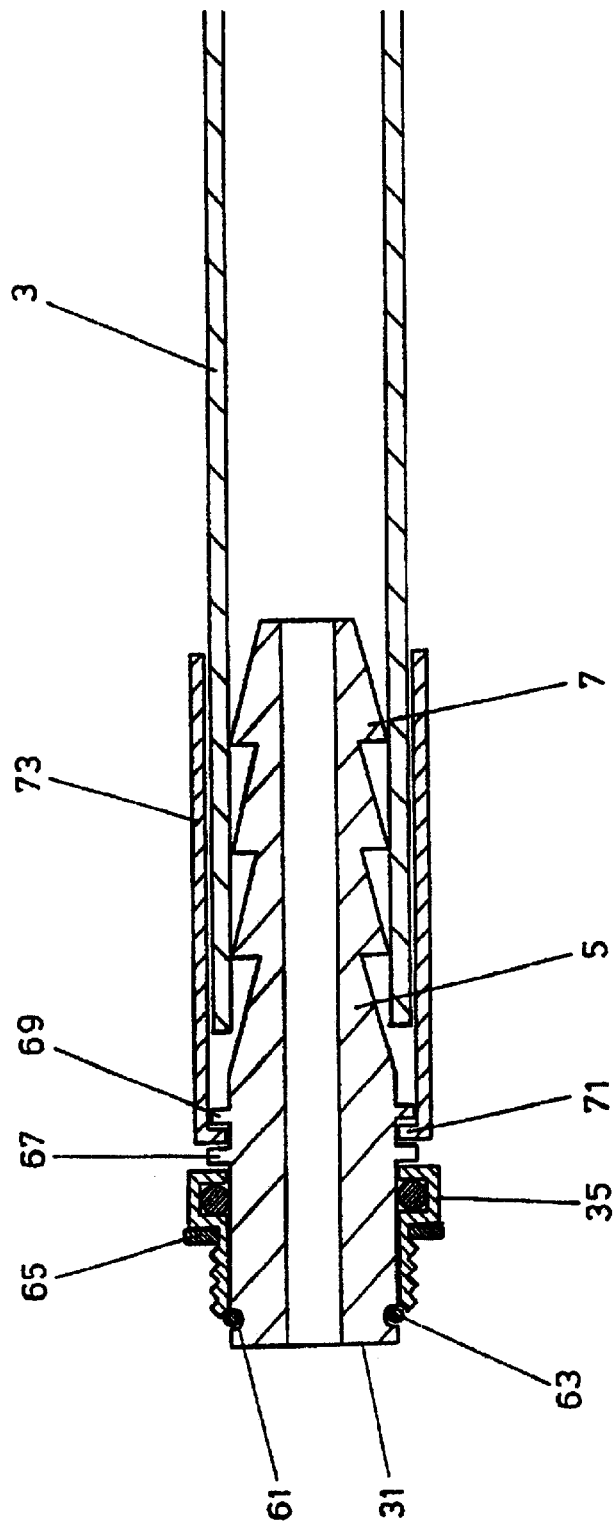
FIG. 3 is a longitudinal section showing a second embodiment of a connector of the invention in engagement with a length of hose.

Referring to FIG. 3 of the accompanying drawings, another embodiment of a connector of the present invention has features in common with the connectors of FIG. 1 and FIG. 2. Such features are given the same reference numerals as the corresponding features of FIG. 1 and FIG. 2 connectors and will not be further described.

In this case the hose engaging element 5 is provided with a groove 61 which is occupied by a split locking ring or circlip 63. This arrangement replaces the end flange 33 of the connector of FIG. 2. When the connector is applied to, for instance, a pipe end, the whole assembly will firmly lock together preventing any possibility of the connector separating from the pipe end.

The O-ring 51 of the FIG. 2 embodiment is replaced, in this embodiment by a Dowty seal 65.

The connector is provided with two integral, annular flanges 67, 69 located adjacent collar 35 and providing between them a recess into which the inturned end 71 of compression collar 73 fits. This arrangement prevents the compression collar being removed from the connector.

It should be appreciated that, in this embodiment, the male threaded connection part can be removed from the hose easily with a standard spanner. In existing hose connectors, such as that described with reference to FIG. 1, such a possibility can only be achieved by incorporating a "barrel nipple" or adapter such as the gripping section 19 of the FIG. 1 arrangement. Accordingly, the present invention enables an easily removable connector to be provided with a relatively simple, and cheap to manufacture, design.

The present invention enables all businesses in the supply chain to reduce their stocking requirements. The hose engaging element may be a standard size item. The male threaded connection collar can be stocked separately to the hose engaging element in all the different male thread sizes that are required. These can be supplied with the circlip which can be fitted by the user. This compares with the current practice of stocking the whole hose assembly appropriate for each male threaded version.

Figure 4:
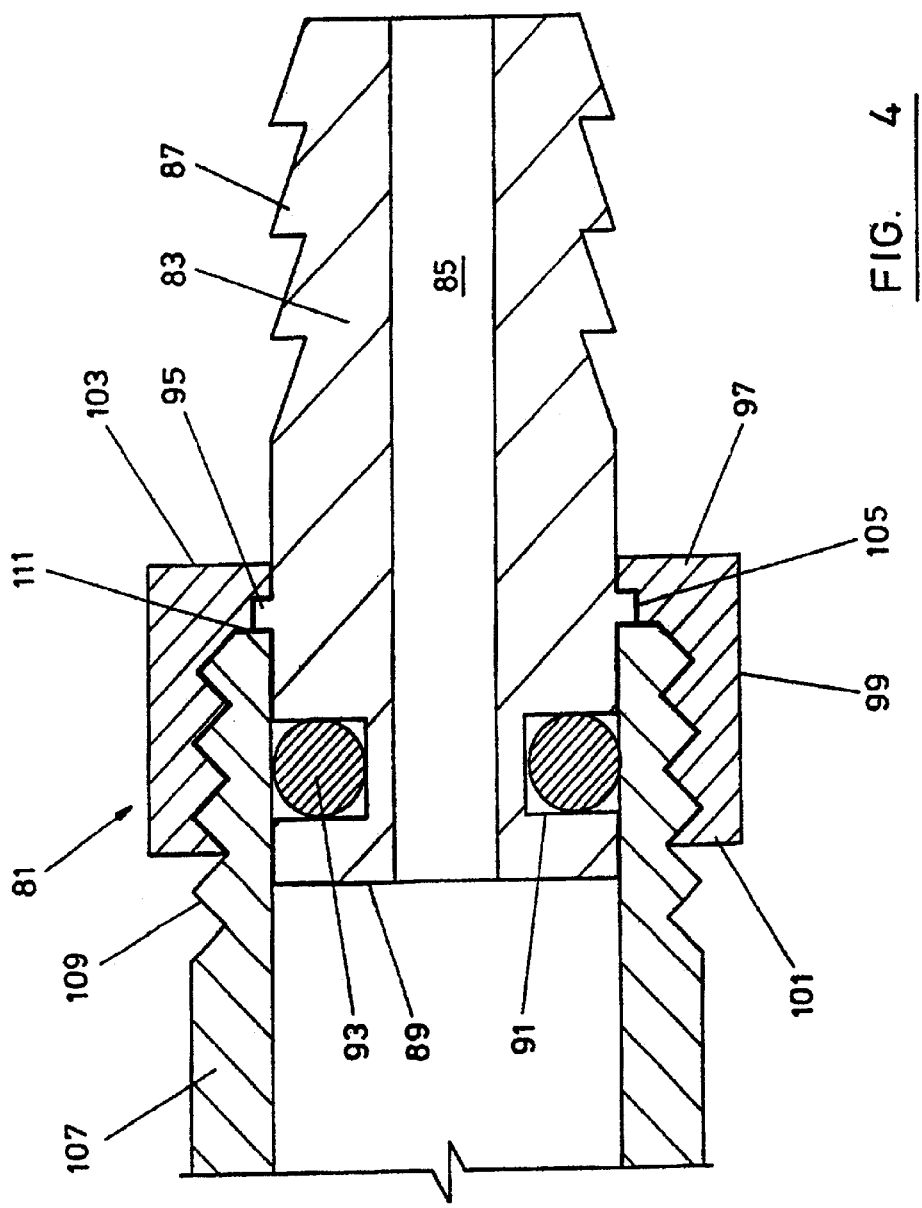
FIG. 4 is a longitudinal section showing a third embodiment of a connector of the invention in engagement with a threaded pipe end.

Referring to FIG. 4 of the accompanying drawings, another embodiment of a connector of the present invention differs from the FIG. 2 and FIG. 3 embodiments in that it is for connection to a pipe end or other element having an external or male thread. The connector 81 includes a hose engaging element 83 which has a hollow bore 85 running therethrough and has a serrated section 87 for engagement with the inner surface of a hose into which the hose engaging element is inserted.

Hose engaging element 83 has a flat end face 89 at that end remote from serrated section 87. Provided adjacent this end is an annular recess 91 which houses an O-ring 93. Axially spaced from recess 91, in the direction towards serrated section 87 is an integral, outwardly extending annular flange 95.

The connector 81 is provided with a collar 97 which is in the form of a ring having a smooth outer surface 99 and flat ends 101 and 103. Internally collar 97 is provided with a threaded section which extends from flat end 101 over about three quarters of the total length of the collar. At that end of the threaded section which is closer to end face 103, collar 99 is provided with a recessed portion 105 which is of a shape and size sufficient to accommodate the flange 95 of the hose engaging element 83. Between recessed portion 105 and end face 103, collar 99 has an internal diameter just greater than that of the hose engaging element 83. Accordingly, it will be seen that flange 95 of hose engaging element 83 prevents movement of collar 97, relative to hose engaging element 83 in a direction to the left of the position as shown in FIG. 4.

Also shown in FIG. 4 is the end 107 of a pipe having an externally threaded section 109. FIG. 4 shows the connector 81 with its collar 97 in threaded engagement with pipe end 107 and with O-ring 93 providing sealing between the hose engaging element 83 and the pipe end 107. In practice a washer, or other sealing element, may be provided within collar 97 at position 111 to provide sealing engagement between the collar and the pipe end.

The collar 97 is desirably in the form of a nut (for instance, a hexagonal nut) which may be screwed, by finger pressure or a spanner or other suitable tool, on to the pipe end. As illustrated in FIG. 4, the arrangement allows the hose engaging element to rotate relative to the pipe end, at least to a limited extent prior to tightening of the collar against the pipe end. In other words, the collar 97 is recessed allowing it to lock tightly on the screwed thread of the pipe, whilst allowing the hose engaging element to rotate inside the pipe.

Once assembled, the hose connector is now free from any vibration, making it less likely to suffer from joint leakage, due to the collar partially or totally becoming unscrewed.

With this FIG. 4 embodiment, the stocking requirements can again be reduced. The hose engaging element may be stocked independently of the external collar. As before it is only the collar which needs to be stocked in different sizes and not the remainder of the hose connector. This is of great advantage since the item which only requires to be stocked in one size is that which is the most costly and takes up most space.

It should be appreciated that, while the above described embodiments have hose engaging elements with serrated hose-gripping elements, this section of the connector can be any suitable hose engaging element. For instance, a simple straight or tapered end could be provided on the connector together with a fastening element such as a jubilee clip to secure the hose to the connector end.

What is claimed is:

1. A connector for forming a connection between a pipe or other item having a threaded pipe end and a length of hose, the threaded pipe end having an axially directed end surface, the connector comprising an elongate hose engaging element and, located thereon, a collar having a threaded portion for direct engagement with the threaded pipe end, wherein the collar is provided with sealing means for sealing between the collar and the hose engaging element, the collar being shaped to accommodate the sealing means in an internal recess such that a free surface of the sealing means bears against the hose engaging element and permits rotation of the hose engaging element during fluid carrying use and wherein the collar is further provided with further sealing means for sealing between the collar and the pipe, the further sealing means being located on the collar to the rear of the threaded portion of the collar and adjacent a radially extending portion on the collar so that the further sealing means bears against the axially directed end surface of the threaded pipe end, wherein the recess includes two radially extending portions separated by a cylindrical portion of greater diameter than the threaded portion of the collar.

2. A connector according to claim 1 wherein the hose engaging element has a first region adapted to engage the hose and a second region, longitudinally spaced from the first region, for accommodating the collar.

3. A connector according to claim 2 wherein the second region of the hose engaging element is provided with means for preventing separation of the collar from that end of the hose engaging element remote from the first region.

4. A connector according to claim 1 wherein the further sealing means includes an O-ring. to the threaded pipe end by means of a spanner or other appropriate tool.

5. A connector according to claim 1 and wherein the threaded portion of the collar is an externally threaded portion.

6. A connector according to claim 1 wherein the threaded portion of the collar is an internally threaded portion.

7. A connector according to claim 1 wherein the collar has at least a section with a polygonal external surface enabling the collar to be rotated relative to the threaded pipe end by means of a spanner or other appropriate tool.

8. A collar for forming a connection between a pipe or other item having a threaded pipe end and a length of hose, the collar being adapted for use with an elongate hose engaging element, the threaded pipe end having an axially directed end surface, the collar having a threaded portion for direct engagement with the threaded pipe end, wherein the collar is provided with first sealing means for sealing between the collar and the threaded pipe end, the first sealing means being located on the collar to the rear of the threaded portion of the collar and adjacent a radially extending portion on the collar so that the first sealing means bears against the axially directed end surface of the threaded pipe end, and second sealing means for sealing between the collar and a hose engaging element about which the second sealing means is adapted to locate, the collar being shaped to accommodate the second sealing means in an internal recess such that a free surface of the second sealing means bears against the hose engaging element and permits rotation of the hose engaging element during fluid carrying use, wherein the recess includes two radially extending portions separated by a cylindrical portion of greater diameter than the threaded portion of the collar.

9. A connector according to claim 3 wherein the means for preventing separation of the collar from that end of the hose engaging element comprises an integral outwardly extending flange on the hose engaging element such that, in assembly of the connector, the collar is passed over the hose engaging element from the first region end of the hose engaging element.

* * * * *